US012179235B2

(12) United States Patent
Fagan

(10) Patent No.: US 12,179,235 B2
(45) **Date of Patent: *Dec. 31, 2024**

(54) DEVICES AND CORRESPONDING METHODS TO REDUCE SORTING OF MAILINGS TO PRODUCE GROUPED MAILINGS

(71) Applicant: Broadridge Output Solutions, Inc., Newark, NJ (US)

(72) Inventor: Marc Fagan, Folsolm, CA (US)

(73) Assignee: Broadridge Output Solutions, Inc., Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,430

(22) Filed: Aug. 7, 2023

(65) Prior Publication Data

US 2023/0372976 A1 Nov. 23, 2023

Related U.S. Application Data

(63) Continuation of application No. 16/895,931, filed on Jun. 8, 2020, now Pat. No. 11,717,859, which is a (Continued)

(51) Int. Cl.

| | |
|---|---|
| ***B07C 5/04*** | (2006.01) |
| ***B07C 1/04*** | (2006.01) |
| ***B07C 3/00*** | (2006.01) |
| ***B07C 5/16*** | (2006.01) |
| ***G07B 17/00*** | (2006.01) |

(52) U.S. Cl.

CPC .................. *B07C 5/04* (2013.01); *B07C 1/04* (2013.01); *B07C 3/00* (2013.01); *B07C 3/008* (2013.01); *B07C 5/165* (2013.01); *G07B 17/00661* (2013.01); *G07B 2017/00685* (2013.01)

(58) Field of Classification Search

CPC .... B07C 5/04; B07C 1/04; B07C 3/00; B07C 3/008; B07C 5/165; G07B 17/00661; G07B 2017/00685; G07B 2017/00475; G07B 2017/00701; G07B 17/00467

See application file for complete search history.

(56) References Cited

U.S. PATENT DOCUMENTS 5,264,665 A * 11/1993 Delfer, III ............ G01G 19/005 177/25.15
5,659,481 A * 8/1997 Qutub ....................... B07C 1/00 235/375

(Continued)

*Primary Examiner* — Thomas Randazzo
(74) *Attorney, Agent, or Firm* — GREENBERG TRAURUIG, LLP

(57) ABSTRACT

A mail item sortation system and method that includes an external controller for culling candidate letters in a mailing job to produce groupings of letters based on industry average weights and/or thicknesses in order to place all the candidate letters going to a single address adjacent to each other, an internal controller, interfaced with the external controller, that utilizes the groupings of letters to manage multiple letter sorters, wherein a specific letter sorter is selected to pair a calculated number of pockets to accommodate the groupings with an actual number of pockets in the selected letter sorter, and a transfer process for moving letters within the letter sorter pockets to a StatementPack machine.

20 Claims, 2 Drawing Sheets

Related U.S. Application Data continuation of application No. 16/440,660, filed on Jun. 13, 2019, now Pat. No. 10,675,660.

(60) Provisional application No. 62/684,543, filed on Jun. 13, 2018.

(56) References Cited

U.S. PATENT DOCUMENTS

| | | | | | |
|---|---|---|---|---|---|
| 5,774,885 | A * | 6/1998 | Delfer, III | G07B 17/00661 | 705/401 |
| 6,748,294 | B1 * | 6/2004 | Overman | B07C 3/00 | 270/52.02 |
| 8,682,479 | B1 * | 3/2014 | Clupper | G06Q 10/063 | 700/226 |
| 10,192,276 | B1 * | 1/2019 | Delfer | G06Q 50/26 | |
| 10,675,660 | B1 * | 6/2020 | Fagan | B07C 1/04 | |
| 11,717,859 | B2 * | 8/2023 | Fagan | B07C 3/008 | 700/223 |
| 2006/0283784 | A1 * | 12/2006 | Roth | B07C 3/00 | 209/584 |
| 2012/0118797 | A1 * | 5/2012 | Berdelle-Hilge | B07C 3/00 | 209/552 |
| 2014/0121826 | A1 * | 5/2014 | Kreitmeier | B07C 3/00 | 700/223 |

* cited by examiner

DEVICES AND CORRESPONDING METHODS TO REDUCE SORTING OF MAILINGS TO PRODUCE GROUPED MAILINGS

CROSS-REFERENCE TO RELATED APPLICATIONS

Not Applicable or

This application is a continuation of U.S. patent application Ser. No. 16/895,931 filed on Jun. 8, 2020, which is a continuation of U.S. patent application Ser. No. 16/440,660 filed on Jun. 13, 2019, which claims priority from U.S. provisional application Ser. No. 62/684,543 filed on Jun. 13, 2018 which are hereby incorporated herein by reference for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

A portion of the material in this patent document is also subject to protection under the maskwork registration laws of the United States and of other countries. The owner of the maskwork rights has no objection to the facsimile reproduction by anyone of the patent document or the patent disclosure, as it appears in the United States Patent and Trademark Office publicly available file or records, but otherwise reserves all maskwork rights whatsoever. The maskwork owner does not hereby waive any of its rights to have this patent document maintained in secrecy, including without limitation its rights pursuant to 37 C.F.R. § 1.14.

BACKGROUND

At least some embodiments of the present disclosure pertain generally to the efficient use of a plurality of physical letter sorters that are physically located at a secondary mail processing facility, with the members of the plurality having a different number of letter holding pockets, for production of assembled groupings of mail items going to a single mailing address (known as StatementPacks or Packs), wherein the secondary mailing facility is physically outside of or distant from a home or primary mailing facility. Typically, the primary mailing facility is a facility at which a large number of mail items are generated (e.g., computer received and created, printed, assembled into individual packaging (e.g., envelop, plastic wrapper, etc.), etc.), however, the secondary mailing facility carries out similar operations, but at the distant location with, normally, fewer pieces of processing equipment, but having the plurality of different sized (pocket number) letter sorters.

BRIEF SUMMARY

In some embodiments, the present disclosure may include an exemplary mail item sortation system that includes at least the following components: an external controller configured to cull candidate letters in a mailing job to: 1) produce groupings of letters based on pre-determined weights, pre-determined thicknesses, or both, and 2) place all of the candidate letters going to a single address adjacent to each other; an internal controller, interfaced with the external controller, that is configured to utilize the groupings of letters to manage a plurality of letter sorters, by at least selecting each specific letter sorter of the plurality of letter sorters to pair a calculated number of pockets to accommodate the groupings of letters with a number of available pockets in each specific selected letter sorter to obtain sorted letters; where each respective number of available pockets varies among the plurality of letter sorters; and a transfer mechanism designed to move the sorted letters within the letter sorter pockets to at least one StatementPack machine.

In some embodiments, the at least one StatementPack machine configured to place a plurality of sorted letters into a single envelope going to a single address.

In some embodiments, the external controller is further configured to utilize a mixing factor analysis to establish a pocket demand required for sorting a given number of letters in the mailing job; and where the internal controller is further configured to select each specific letter sorter in the plurality of letter sorters based at least in part on the pocket demand and the number of available pockets in each specific selected letter sorter.

In some embodiments, the external controller is further configured to utilized variable values of the mixing factor to determine one or more alternate ways to lower the pocket demand.

In some embodiments, the exemplary mail item sortation system may further include a sweeper, configured to move the sorted letters in one or more filled letter sorter pockets to the at least one StatementPack machine without waiting for a completion of collation of all of the candidate letters.

In some embodiments, the at least one StatementPack machine is configured to: a) determine, for the sorted letters, weights, thicknesses, or both; and b) communicate with the external controller to verify that the weights correspond to the pre-determined weights and the thicknesses correspond to the pre-determined thicknesses.

In some embodiments, the present disclosure may include an exemplary method of mail item sortation, at least having: culling, by an external controller, candidate letters in a mailing job to: 1) produce groupings of letters based on pre-determined weights, pre-determined thicknesses, or both, and 2) place all of the candidate letters going to a single address adjacent to each other; managing, by an internal controller, interfaced with the external controller, a plurality of letter sorters, by at least selecting each specific letter sorter of the plurality of letter sorters to pair a calculated number of pockets to accommodate the groupings of letters with a number of available pockets in each specific selected letter sorter to obtain sorted letters; and physically moving, by a transfer mechanism, the sorted letters within the letter sorter pockets to at least one StatementPack.

BRIEF DESCRIPTION OF THE SEVERAL VIEWS OF THE DRAWINGS

The disclosure may be more fully understood by reference to the following drawings which are for illustrative purposes only.

The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ the present disclosure.

DETAILED DESCRIPTION

Among those benefits and improvements that have been disclosed, other objects and advantages of this disclosure can become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given in connection with the various embodiments of the represent disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described below, various embodiments of the disclosure may be readily combined, without departing from the scope or spirit of the disclosure. Further, when a particular feature, structure, or characteristic is described in connection with an implementation, it is submitted that it is within the knowledge of one skilled in the art to affect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 1:
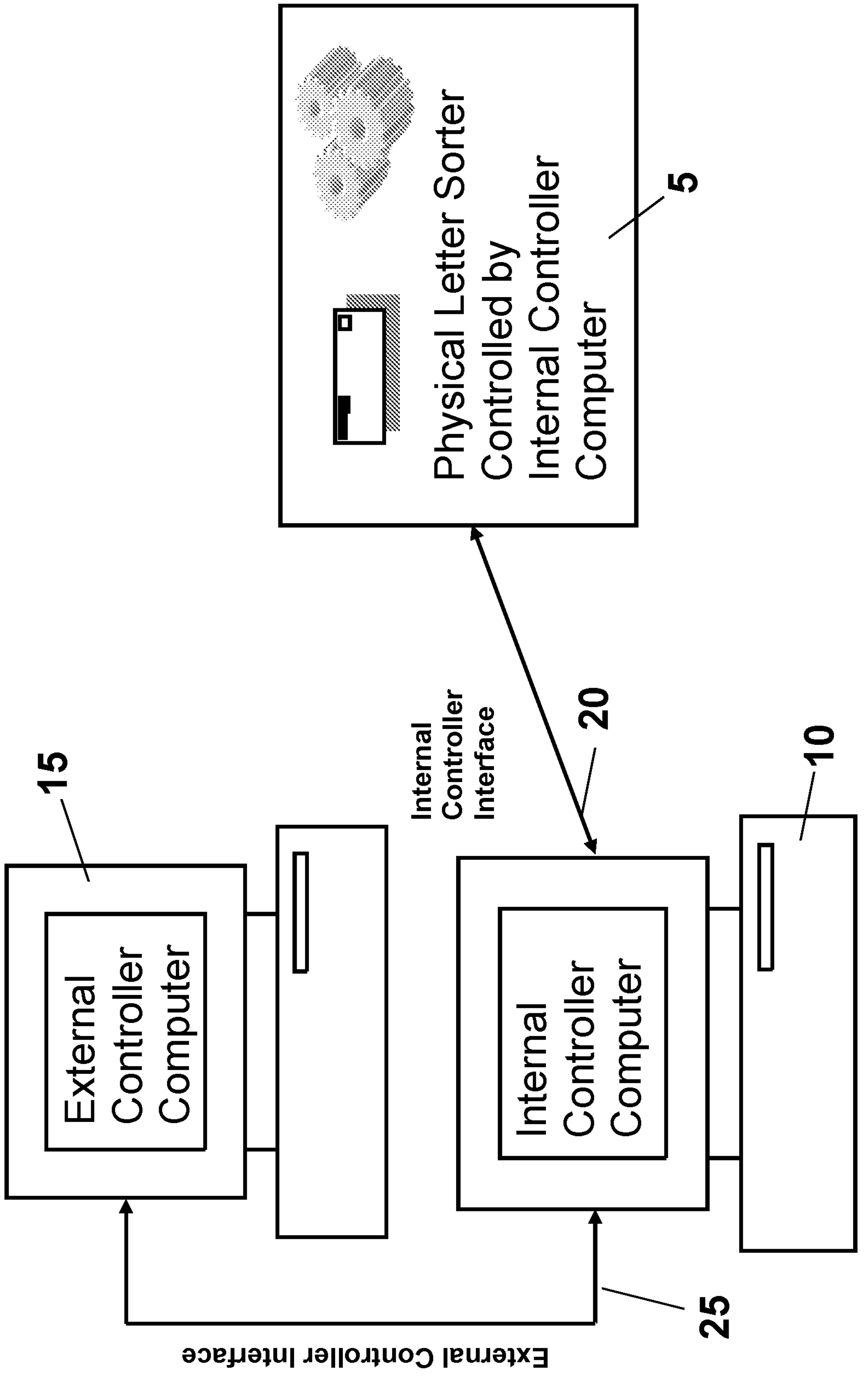
FIG. 1 is an illustrative flow diagram of the relationships within the subject letter sorting system and method showing the external controller for holding mailing item information, the internal controller for taking information from the external controller and operating a selected letter sorter (one out of a plurality of letter sorters), and the human sweeper carrying the letters from the selected letter sorter to the StatementPack machine.
Figure 2:
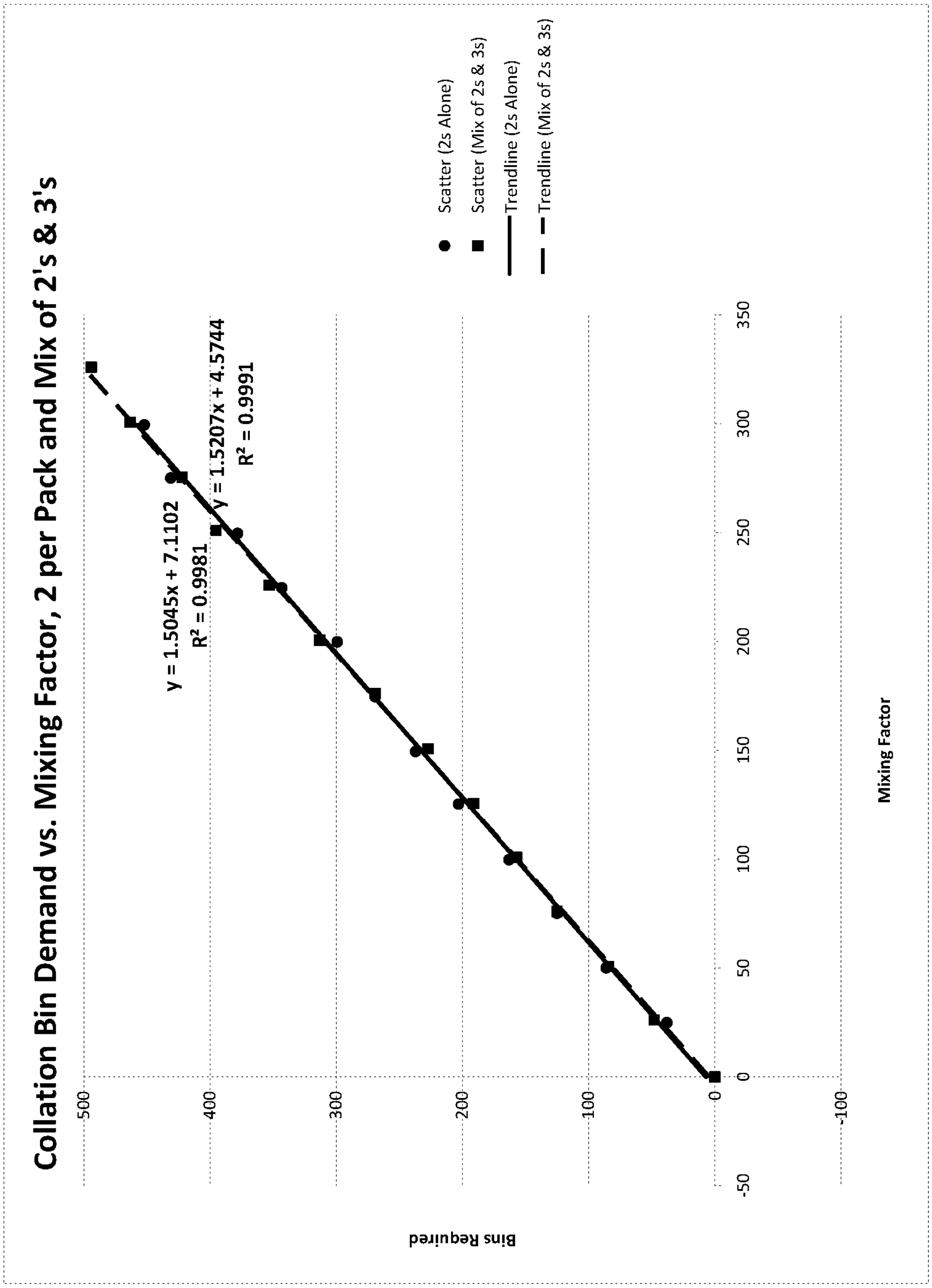
FIG. 2 presents an exemplary chart for the collation bin/pocket demand versus the mixing factor at two per pack and a mix of 2s and 3s in accordance with some embodiments of the present disclosure.

Generally, the subject disclosure is described in relation to FIGS. 1 and 2 and is a system that permits an exemplary secondary mailing facility to efficiently generate grouped mail items (StatementPacks) going to a single address. When the home mailing facility produces StatementPacks, electronic culling and collating processes direct candidate mail pieces to an exemplary StatementPack machine in sufficiently reduced time. The StatementPack machine/assembler is described in detail in co-pending patent application Ser. No. 13/754,013 that was filed on Jan. 30, 2013 (which is herein incorporated by reference in its totality), and is enclosed as Appendix A. In some embodiments, after a process for culling candidate mail pieces from bulk mail pieces is employed, the present disclosure utilizes the StatementPack machine/assembler in a computer controlled mail piece assembly and wrapping system to generate grouped mailings, where the StatementPack machine/assembler may include: 1) a mail piece feeder; 2) a mail piece reader coupled to the feeder identifies suitable candidate mail pieces; 3) a collator coupled to the feeder for collating multiple identified mail pieces; 4) a buffer coupled to the collator for regulating the delivery rate of the multiple mail pieces exiting to a wrap inserter; 5) a wrap inserter coupled to the buffer for wrapping mail pieces and selected inserts into a mailing container; 6) a printer interfaced with the wrap inserter for printing information onto the mailing container; 7) an outstacker coupled to the wrap inserter for transferring envelope wrapped mail pieces and selected inserts to a desired location; and 8) the computer with suitable programming for operating the StatementPack machine. U.S. Pat. No. 10,192,276, owned by the subject Assignee, is herein incorporated in its totality and describes the StatementPack machine/assembler utilized in conjunction with the subject disclosure.

In some embodiments, to produce StatementPacks at a secondary mailing facility that is outside of the primary mailing facility, a physical culling and collating process is required by the present disclosure. In some embodiments, the present disclosure provides an exemplary inventive method of using a letter sorter to collate most if not all candidate mail pieces in a fewest number of passes (e.g., a single pass). The subject system describes how to set up and operate such a process and how to forecast collating capacity requirements, thereby maximizing machine use and minimizing the time required for commingling. The subject system permits one letter sorter/collator, the one with the fewest letter pockets, to be utilized for the selected job and to let larger letter sorters/collators to be employed for other projects. The subject system maximizes the efficiency of the operation by choosing the letter sorter/collator that is exactly matched to the actual number of letters being sorted and not wasting larger letter sorters/collators on a smaller job.

The terms "first pass", "second pass", and "loop" refer to the number of times letters must run through sorting machines until they reach their final sortation status. For example, say a sorting machine has 100 pockets, but a particular batch of 10,000 mail pieces must be sorted into 150 different groups. The machine could be configured to have pockets 1-99 collect mail pieces for groups 1-99, with the $100^{th}$ pocket collecting mail pieces for groups 100-150. After passing all 10,000 mail pieces through the machine once, sorting would be complete for all those mail pieces belonging to groups 1-99; those mail pieces would be referred to as "finishing on the first pass". Those letters could then be removed from the machine, and pockets 1-51 reconfigured to collect groups 100-150 (leaving pockets 52-100 disabled). At that point the "first pass" letters from the $100^{th}$ pocket would be re-entered into the machine (often referred to as "loop") and complete their sortation on the "second pass".

In a typical commercial commingling operation, the "first pass" is used to sort mail pieces into large groups with similar ZIP codes (often called the "3-digit" level); the USPS offers a modest postage discount for mail pieces sorted in this manner. An additional, and more substantial, discount is typically available for mail pieces sorted further, to the so-called "5-digit" level; a typical commingling operation may achieve this through use of the "second pass". Typically, this "second pass" is performed on each group that came out of the "first pass".

Illustrative Examples of Inventive Strategy and Knap Sacking

For example, each day the Commingling Service Provider (the CSP, which is the secondary mailing facility) may select the 11-digit ZIP codes for which candidate mail pieces are to be culled. Culling can be done during the CSP's normal "first pass" and is handled in the External Controller Computer 15 that is shown in FIG. 1. Electronic report(s) of the culling results may serve as inputs to the collating process and into the Internal Controller Computer 10 via an interface connection 25.

In some embodiments, the weight and thickness of individual candidates may not be determined until they reach the StatementPack machine (a sensor in the StatementPack machine determines thickness and a scale measures weight). Therefore, the basic grouping or default "knap sacking" strategy may be based on industry average weights and/or thicknesses, which should deliver close-to-optimal results despite not knowing the actual weights and/or thicknesses beforehand. The CSP can automatically adjust the knap sacking strategy to try to improve results.

In some embodiments, culled candidate mail pieces are next processed by an exemplary collating sorter (letter sorter/collator). As seen in FIG. 1, during the exemplary inventive collation, the physical candidate mailing items (letters) may be sorted by one of several different sized physical letter sorters 5 (first letter sorter with fewest pockets), 6 (second letter sorter with more pockets), and 7 ($N^{th}$ letter sorter with the largest number of pockets) that are controlled, as noted above, by the Internal Controller Computer 10, linked via an Internal Controller Interface 20, 21, or 22, under the direction of an External Controller Computer 15, linked via an External Controller Interface 25 to the Internal Controller Computer 10.

The External Controller Computer 15 is programmed to analyze the electronic results of the culling process to determine an exemplary inventive collating plan. The Internal Controller Computer 10 of the letter sorter chosen for collation must possess an External Controller Interface 25 in order for the External Controller Computer 15 to direct to which pocket each candidate letter should be sent. In some embodiments, the exemplary External Controller Interface 25 is a so-called real time interface, enabling the External Controller Computer 15 to give directions for each letter as it is drawn into the sorting machine. The External Controller Computer 15 responds to the Internal Controller Computer's 10 request for direction on each letter fast enough for the letter to be directed to the selected letter sorter and the correct pocket within that letter sorter without undue delay.

In some embodiments, the purpose of the inventive collating process is to place all the candidates for each potential StatementPack adjacent to each other, so that they can later be fed into the StatementPack machine one after the other, as required by the machine. To do so, the External Controller Computer 15 may direct the first candidate mailing piece of each pack to an unused pocket; when the next candidate mailing piece for that StatementPack is sorted, it is directed to the same pocket. If, after analyzing the results of the culling process, the External Controller Computer 15 determines that this $2^{nd}$ candidate mailing piece is the last for that StatementPack, that pocket then becomes available again for collating candidates for a different StatementPack.

In some embodiments, when a pocket contains some but not all of the candidates expected for a particular StatementPack, it is "busy" and cannot accept candidates for any other StatementPack. When all the pockets on a machine are "busy" and a candidate enters that doesn't belong to any of the "busy" pockets, it must be out-sorted and "looped" to a $2^{nd}$ collating pass.

Once the culling process is achieved, the smallest available letter sorted 5, 6, or 7 is selected that will have sufficient (but not too many) pockets to hold the letters in the job. The Internal Controller Computer then directs that selected letter sorter 5, 6, or 7 to process that job.

Once the letters in a particular job are sorted of the proper letter sorter 5, 6, or 7, human sweepers physically transport 30, 31, or 32 the contents of the letter sorter 5, 6, or 7 to the StatementPack machine 40 for processing.

If the culling ZIP codes are sufficiently chosen, the out-sorted volume (non-candidate mailing pieces for grouped mailings) is minimized; if the culling strategy has been suitably sufficient, the collating process' $2^{nd}$ pass volume is minimal. In some embodiments, when the $2^{nd}$ collating pass begins, none of the pockets would be "busy" (because all the candidates for all the StatementPacks collated by those pockets have been "finalized"), so the small $2^{nd}$ pass volume finalizes quickly. Electronic report(s) of the collating results serve as inputs to the StatementPack process. In some embodiments, the collating sorter disconnects from the External Controller Computer 15 and returns to normal service when collating is complete.

In some embodiments, The StatementPack machine/assembler 40 is configured/programmed to measure candidate mailing pieces' weights and/or thicknesses accurately enough to produce only USPS-compliant StatementPacks. In some embodiments, a double detect system (two or more candidates accidentally being fed into the machine at once) may be employed to ensure that only qualified candidate mailing pieces are allowed into StatementPacks. In some embodiments, when the StatementPack machine rejects candidates when their inclusion would cause the sum of candidate mailing pieces' weights and/or thickness for a single StatementPack to exceed USPS rule. In some embodiments, the inventive knap sacking strategy is configured so that the out-sorted candidate volumes would be minimal. In some embodiments, StatementPack machine may be configured to automatically generate Electronic report(s) of the StatementPack results.

In some embodiments, the CSP may be configured to conduct typical $2^{nd}$ pass commingling operation within defined AADC (Automated Area Distribution Center of the U.S. Postal Service, USPS) groupings, and may incorporate these groupings into the culling, collating, and StatementPack operations as outlined herein, the output of the StatementPack machine, both StatementPacks and out-sorted candidates, can be finalized in one pass along with the other, non-StatementPack candidate mail for that AADC, and mailed on the same day.

In some embodiments, the exemplary inventive knap sacking refers to cases where a particular mailbox has so many candidate mailing pieces (e.g., statements) that the CSP has to choose whether and how to divide them between multiple StatementPack machines. For example, the machine can put as many as five letters into a single StatementPack, but it may out-sort candidate mailing pieces when their inclusion would cause the StatementPack machine to violate USPS folded mail limits on weight and/or thickness. Such a situation might present the CSP with the choice of making, for example but not limiting to, (1) a 4-candidate pack and an orphan or (2) a 3-candidate pack and a 2-candidate pack. In some embodiments, the division into StatementPacks may be based, at least in part, on weights, thicknesses, and/or postage rates either might prove a more profitable case.

Illustrative Examples of the Inventive Collating Capacity Management

In some embodiments, the inventive physical StatementPack candidate mailing piece preparation operation may be configured to have sufficiently minimal or no 2^nd pass, limited overhead, and the StatementPack machine/assembler 40 can start processing collation output before the inventive collation finishes.

In some embodiments, bin (or pocket) demand (defined as the number of pockets required to sort a given batch of mail) for collation can be estimated by calculating the Mixing Factor (MF) (a measurement of how "mixed up" the candidates are, defined below) for a batch of candidates and then multiplying by 1.5 (because, on average, that number of pockets may be enough to collate all the candidates without any 2^nd pass volume). In some embodiments, the MF may be equal to the average number of "other" StatementPacks each candidate in the batch is "captured" in. In some embodiments, a candidate mailing piece is considered "captured" in a different StatementPack if it has at least one of another StatementPack's candidate mailing pieces on either side of it (i.e., before it and after it) as it is fed into the collating sorter. This concept is explained by non-limiting examples below.

Consider the following batch of 24 StatementPack candidates destined for 10 different mailboxes, A through J:

AAABBCCDDDDEEFFGGHHIIJJJ

This batch, as it happens, is already perfectly sorted. It should be apparent that if these 24 documents were fed into a sorter (from left to right i.e. A, A, A, B, B, C, . . . etc.) for collation (clearly not necessary in this case of course) they would require only one pocket (or bin), because that pocket would always be "ready" to accept the next candidate, and no candidate would ever have to go to a different pocket. Note that no candidate in this batch has any "other" StatementPacks' candidates "both" to its left and to its right, so the Mixing Factor for this batch is 0/24=0.0.

Now consider the same batch with two candidates swapped, so that one A candidate is tucked inside the B StatementPack, and vice-versa:

AA<u>BA</u>BCCDDDDEEFFGGHHIIJJJ

This batch has one B candidate "captured" in the A StatementPack, and one A candidate "captured" in the B StatementPack (because both have a "different" StatementPack's candidates "both" to its left and to its right—and no other candidates do), giving a Mixing Factor of 2/24=0.1. This relatively low MF value of 0.1 makes sense because only about a tenth of the candidates are "captured" inside other StatementPacks. If these 24 documents were fed into a sorter for collation, they would require 2 pockets, because the first B candidate would have to go into a 2^nd pocket since the 1^st pocket would be "busy" waiting for the third A candidate. Once the third A candidate goes into the 1^st pocket with the other As, and the second B candidate goes into the 2^nd pocket with the other B, the rest can be captured in either the first or the second pocket.

Now consider the original batch again, but instead swap an A and a J:

A<u>J</u>ABBCCDDDDEEFFGGHHIIJ<u>A</u>J

This batch has 20 candidates "captured" in the A StatementPack, and 20 candidates "captured" in the J StatementPack (and none of the other StatementPacks have any "different" candidates "captured" inside them), giving an MF of 40/24=1.7. This number also makes sense because almost all of the candidates are "captured" inside two other StatementPacks: A and J; put another way, each candidate is, on average, "captured" inside 1.7 StatementPacks, which is the definition of the Mixing Factor. If these 24 documents were fed into a sorter for collation, they would require just 3 pockets (the A pocket and the J pocket would be "busy" while a 3^rd pocket collated the rest).

Now consider just one more example:

<u>ABCDEFGHIJ</u>AABCDDDEFGHIJJ

This batch is anti-sorted, i.e. it's worse than random; its MF is 105/24=4.4. If these 24 documents were fed into a sorter for collation, they would require 10 pockets, one for every StatementPack; no pocket would be able to collate more than one StatementPack. This would be a case of "maximum bin demand" and would be a very inefficient use of bin capacity.

It can be shown that as the statement sequence in this sample batch becomes more and more randomized the MF may approach 96/24=4.0, which is equal to the number of candidates divided by 6. In some embodiments, this rule holds no matter how many candidates are in the batch and stays the same regardless of the number of StatementPacks they make up.

In some embodiments, as the number of candidates rises, the law of averages quickly may overwhelm the outlier cases described above and the relationship between MF and bin demand may settle into a predictable pattern that is independent of the number of candidates per pack.

FIG. 2 shows the illustrative results of exemplary simulated collations using candidate mailing pieces batches with MF's ranging from 0.0 (completely sorted) to 4.0 (completely random), and with candidates-per-pack of 2.0 (2's alone) and 2.4 (mix of 2's and 3's). The fitted linear curves exhibit unexpected r-squared values.

So, if, for example, a batch contained 16,000 candidates in a random sequence, the most likely MF would be 16,000/6=2,667, no matter if they were all 2-candidate packs, or 3-candidate packs, etc., or any combination.

The FIG. 2 graph shows that the way to estimate the most likely number of bins required to collate 16,000 candidates in a random sequence (and have no need for a 2^nd collation pass) is to multiply the MF by 1.5, or 2,667×1.5=4,000.

In some embodiments, StatementPack candidate ailing pieces batches typically tend to have MF's that may be far less than completely random; for example, their MF's may be only about 25% of a random MF. So, a typical mailing facility would expect 16,000 real StatementPack candidates to have an MF of around 667, which would require only 1,000 bins to collate without any need of a 2^nd pass in accordance with principles of the present disclosure.

Given this expectation, and the understanding that a single 480-bin sorter may be used for collation, the exemplary mailing facility would employ the following culling strategy: assign 2 pockets for culling and divide AADCs between them so that each was expected to get about the same number of candidates, i.e. 8,000.

Under this culling strategy the mailing facility would expect two candidate batches, each perhaps 20 trays' worth, with MF's of around 667÷2=333. As collation of the first batch approached the halfway point, all 480 bins (which is just a little less than 333*1.5=500) would probably become "busy" waiting for matching candidate mailing pieces, so few candidate mailing pieces would be sent to a "try again later" loop bin and require a 2nd pass.

At the end of the 1st pass of the first batch, no collation pockets would be "busy" anymore because none of those pockets would be waiting for the looped pieces, so perhaps half a tray of statements would be in the "try again later" bin. Once they were fed into the machine, again no pockets would be "busy" anymore, so the second batch could begin, and it would process just as quickly as the first, as if the machine had been empty.

In this non-limiting illustrative example, the mailing facility could expect to use a single 480-pocket machine to collate a much larger number, for example, 80,000 StatementPack candidate mailing pieces with a sufficiently low 2nd pass volume by dividing the AADCs among 10 culling pockets, instead of just 2. If, for example, the Mixing Factor of the exemplary mailing facility's StatementPack candidate mailing pieces jumped to 50% of random, using 20 culling pockets instead of 10 would deliver the same low 2nd pass rates. In some embodiments, if the mailing facility's MF stayed at 25% but it used 20 culling pockets instead of 10, a 240-pocket sorter would be sufficient for collation while still expecting a very low 2nd pass collation volume.

Illustrative Examples of the Inventive Dynamic Adjustments of MF

In some embodiments, an illustrative inventive methodology may include a step of artificially lowering the mixing factor by analyzing reports coming from the culling processes to search for alternate ways to lower bin demand. One way is to have the operator feed trays of mail into the collation machine not in the order they came off of the culling machine, but instead in whichever order gives the lowest MF. In some embodiments, the illustrative inventive methodology may include limit the utilizing a heuristic search method.

In some embodiments, the illustrative inventive methodology may include forecasting loop at the start of the process and then execute a "loop early" strategy against candidate mailing pieces with the highest capture rates to lower the effective MF, allowing a much larger portion of the batch to collate on the first pass. For example, in the A and J swap case above, if the A and J pieces were all looped to a mandatory 2nd pass, only 2 pockets would be required, instead of 3, to collate them all.

Illustrative Examples of the Inventive Parallel Processing

In some embodiments, at the end of each batch, every collation pocket's contents may be 100% ready for StatementPack packaging. In some embodiments, sweepers need only keep each pocket's contents in sequence as they collect candidates for transport to the StatementPack machine. After the 2nd or 3rd batch, each collation pocket may contain a sufficiently few letters, so sweepers can gather them quickly and not be concerned with "parents", "children", tray tags, or the order in which pockets are cleared, or other laborious tasks typically associated with conventional end-of-batch commingling activities. In some embodiments, this may allow the CSP to get the StatementPack machine up and running without waiting for collation of the entire day's candidate mailing pieces to complete. In some embodiments, by overlapping these processes average StatementPack turnaround time may be shortened, making it easier to achieve a same day finish. In some embodiments, the CSP may be able to align the StatementPack culling strategy with the commingling operation's 2nd pass AADC divisions, then as completed batches of StatementPacks (and orphans, if any) come off the machine they would be ready to be finalized immediately.

Illustrative Examples of Inventive Utilization of StatementPack Machine

In some embodiments, as candidates are fed into the StatementPack machine their weights and/or thicknesses may be measured accurately so the CSP can be confident that StatementPacks exiting the machine would be USPS compliant. In some embodiments, double-picks by the feeder may be detected and out-sorted.

In some embodiments, since the machine may out-sort candidates that would otherwise cause the resulting StatementPack to be too thick and/or too heavy, a conservative knap sacking strategy may be employed when individual candidate weights and/or thicknesses are unknown. In some embodiments, the illustrative inventive methodology may limit all StatementPacks to either 2 or 3 candidates.

In some embodiments, the exemplary StatementPack machine may use a Multiline Optical Character Reader (MLOCR) or U.S. Postal Service's Intelligent Mail barcode (IMB) to verify document id's and print CASS certified addresses on StatementPack send envelopes. In some embodiments, the exemplary StatementPack machine may also print a unique 2D barcode adjacent to the send address to support inside-outside match verification. In some embodiments, the CSP's designated return mail address may be printed in the Return Address area of each envelope so, if for any reason the USPS is unable to deliver the StatementPack the CSP can process the original pieces as it sees fit.

In some embodiments, each StatementPack may also have a fully USPS-compliant IMB symbol printed with the send address, and an electronic record may be made available correlating it with the identities of the documents contained in the StatementPack. In some embodiments, the mailer can then relate any StatementPack scan events reported by the USPS to the documents contained in that particular StatementPack. This information could be important to the mailers of the documents contained in the StatementPack, providing specific answers to questions regarding transit or tracing of the original letters.

In some embodiments, the physical StatementPack packaging can be added to any commingling operation with only minimal impact to existing capacity yet yield substantial postage savings. In some embodiments, the subject disclosure includes a mail sortation system for use in a commingling mailing operation for minimizing the postage required to mail a plurality of physical mail items by pre-sorting the mail items in preparation for assembly into one or more mailing containers that hold multiple mail items being mailed to a same mailing address, as detailed herein. In some embodiments, the exemplary inventive system may include: a) a device for culling mail items into candidates for commingling based on 11-digit ZIP codes during a first pass process and generating electronic reports of the culled candidates results for commingling; b) a mail item sorter, comprising: i) a device to sort the mail items into specific bins; ii) a first controller computer programmed for directing the operation of the mail item sorter, wherein the programming provides the mail item sorter the capability of processing said 11-digit ZIP codes information for the incoming mail item candidates; iii) a device for interfacing the mail item sortation device with said first controller computer; c) a second controller computer programmed for analyzing the culled candidate electronic reports to determine an inventive collating plan and to give directions for each mail item as it is drawn into the mail item sorter, thereby providing said mail item sorter the capability of processing said 11-digit ZIP codes information for the incoming mail item candidates; and d) a device for interfacing in real time the first controller computer with the second controller computer, where the inventive collating plan is performed on the mail item sorter to direct to which the specific bin each candidate mail item is sent.

In some embodiments, the subject disclosure may provide for an exemplary inventive method for mail sortation for use in a commingling mailing operation for minimizing the postage required to mail a plurality of physical mail items by pre-sorting the mail items in preparation for assembly into one or more mailing containers that hold multiple mail items being mailed to a same mailing address as detailed herein. In some embodiments, the exemplary method may include: a) culling mail items into candidates for commingling based on 11-digit ZIP codes during a first pass process and generating electronic reports of the culled candidates results for commingling; b) utilizing a mail item sorter for sorting the culled mailed items, wherein the mail item sorter comprises: i) using a device to sort the mail items into specific bins; ii) a first controller computer programmed for directing the operation of the mail item sorter, wherein the programming provides the mail item sorter the capability of processing the 11-digit ZIP codes information for the incoming mail item candidates; iii) using a device for interfacing the mail item sortation devices with the first controller computer; c) employing a second controller computer programmed for analyzing said culled candidate electronic reports to determine an inventive collating plan and to give directions for each mail item as it is drawn into the mail item sorter, thereby providing the mail item sorter the capability of processing said 11-digit ZIP codes information for the incoming mail item candidates; and d) using a device for interfacing in real time the first controller computer with the second controller computer, where the inventive collating plan is performed on the mail item sorter to direct to which specific bin each candidate mail item is sent.

An embodiment of the subject disclosure is mail item sortation system and method, comprising: an external controller for culling candidate letters in a mailing job to produce groupings of letters based on industry average weights and/or thicknesses in order to place all the candidate letters going to a single address adjacent to each other; an internal controller, interfaced with the external controller, that utilizes the groupings of letters to manage a plurality of letter sorters, wherein a specific letter sorter in the plurality of letter sorters is selected to efficiently pair a calculated number of pockets to accommodate the groupings with an actual number of pockets in the selected letter sorter; the plurality of letter sorters wherein the actual number of pockets varies from one letter sorter to another; and a transfer process for moving letters within the letter sorter pockets to a StatementPack machine.

Another embodiment of the subject disclosure further comprises a StatementPack machine for placing multiple letters within an envelope going to a single address. Also, an embodiment of the subject disclosure comprises the external controller utilizing a mixing factor analysis to establish a pocket demand required for sorting a given number of letters in a mail job, then the specific letter sorter in the plurality of letter sorters is selected to pair a calculated number of pockets to accommodate the groupings with an actual number of pockets in the selected letter sorter. Additionally, an embodiment of the subject disclosure includes a situation in which the mixing factor is artificially lowered by analyzing applicable reports coming from the culling for alternate ways to lower pocket demand. Further, an embodiment of the subject disclosure includes that possibility that filled pockets may be moved by a sweeper to the StatementPack machine without waiting for collation of the entire job. Finally, the subject disclosure and technology has the StatementPack machine actually determining weights and/or thicknesses and communicating with the external controller to verify that the application of the industry average weights and/or thicknesses is correct.

Embodiments of the present disclosure may be described with reference to equations, algorithms, and/or flowchart illustrations of methods according to embodiments of the disclosure. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various devices, such as hardware, firmware, and/or software including one or more computer program instructions embodied in computer-readable program code logic. As may be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create mechanisms for implementing the functions specified in the equation(s), algorithm(s), and/or flowchart(s).

Accordingly, the equations, algorithms, and/or flowcharts support combinations of structures for performing the specified functions, combinations of steps for performing the specified functions, and computer program instructions, such as embodied in computer-readable program code logic structures, for performing the specified functions. It may also be understood that each equation, algorithm, and/or block in flowchart illustrations, and combinations thereof, may be implemented by special purpose hardware-based computer systems which perform the specified functions or steps, or combinations of special purpose hardware and computer-readable program code logic structures.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including devices which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation(s), algorithm(s), and/or block(s) of the flowchart(s).

In some embodiments, the present disclosure may include an exemplary mail item sortation system that includes at least the following components: an external controller configured to cull candidate letters in a mailing job to: 1) produce groupings of letters based on pre-determined weights, pre-determined thicknesses, or both, and 2) place all of the candidate letters going to a single address adjacent to each other; an internal controller, interfaced with the external controller, that is configured to utilize the groupings of letters to manage a plurality of letter sorters, by at least selecting each specific letter sorter of the plurality of letter sorters to pair a calculated number of pockets to accommodate the groupings of letters with a number of available pockets in each specific selected letter sorter to obtain sorted letters; where each respective number of available pockets varies among the plurality of letter sorters; and a transfer mechanism designed to move the sorted letters within the letter sorter pockets to at least one StatementPack machine.

In some embodiments, the at least one StatementPack machine configured to place a plurality of sorted letters into a single envelope going to a single address.

In some embodiments, the external controller is further configured to utilize a mixing factor analysis to establish a pocket demand required for sorting a given number of letters in the mailing job; and where the internal controller is further configured to select each specific letter sorter in the plurality of letter sorters based at least in part on the pocket demand and the number of available pockets in each specific selected letter sorter.

In some embodiments, the external controller is further configured to utilized variable values of the mixing factor to determine one or more alternate ways to lower the pocket demand.

In some embodiments, the exemplary mail item sortation system may further include a sweeper, configured to move the sorted letters in one or more filled letter sorter pockets to the at least one StatementPack machine without waiting for a completion of collation of all of the candidate letters.

In some embodiments, the at least one StatementPack machine is configured to: a) determine, for the sorted letters, weights, thicknesses, or both; and b) communicate with the external controller to verify that the weights correspond to the pre-determined weights and the thicknesses correspond to the pre-determined thicknesses.

In some embodiments, the present disclosure may include an exemplary method of mail item sortation, at least having: culling, by an external controller, candidate letters in a mailing job to: 1) produce groupings of letters based on pre-determined weights, pre-determined thicknesses, or both, and 2) place all of the candidate letters going to a single address adjacent to each other; managing, by an internal controller, interfaced with the external controller, a plurality of letter sorters, by at least selecting each specific letter sorter of the plurality of letter sorters to pair a calculated number of pockets to accommodate the groupings of letters with a number of available pockets in each specific selected letter sorter to obtain sorted letters; and physically moving, by a transfer mechanism, the sorted letters within the letter sorter pockets to at least one StatementPack.

Although the description above contains many details, these should not be construed as limiting the scope of the disclosure but as merely providing illustrations of some of the presently preferred embodiments of this disclosure. Therefore, it may be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A mail item sortation system, comprising:
a controller configured to:
cull candidate letters in a mailing job to establish pocket demand for sorting according to a mixing factor analysis; and
control a plurality of letter sorters based on the pocket demand.

2. The mail item sortation system of claim 1, wherein the controller is further configured to determine an alternate way to lower the pocket demand.

3. The mail item sortation system of claim 1, wherein the controller is further configured:
determine at least one candidate letter of the candidate letters;
determine at least one captured candidate letter of the candidate letters, having at least one particular destination; and
determine a mixing factor based on the mixing factor analysis of the at least one captured candidate letter and the at least one candidate letter.

4. The mail item sortation system of claim 3, wherein the controller is further configured to route at least one batch of candidate letters in a particular order based on the mixing factor; wherein the at least one batch of candidate letters comprises the at least one captured candidate letter and the at least one candidate letter.

5. The mail item sortation system of claim 1, wherein the controller is further configured to collate the candidate letters according to at least one predetermined destination.

6. The mail item sortation system of claim 5, wherein the controller is further configured to determine a minimum number of collation passes to collate the candidate letters according to the at least one predetermined destination.

7. The mail item sortation system of claim 1, wherein the controller is further configured to route the candidate letters to at least one particular letter sorter of the plurality of letter sorters based on the pocket demand, a number of collation pockets, and a maximum number of collation passes.

8. The mail item sortation system of claim 7, wherein the controller is further configured to determine the pocket demand as X times of the mixing factor, wherein X is a predetermined multiplier.

9. The mail item sortation system of claim 1, further comprising a transport mechanism configured to physically move sorted letters within the plurality of letter sorters to an assembler.

10. The mail item sortation system of claim 9, wherein the assembler is configured to package sets of the sorted letters based on a plurality of parameters to produce a plurality of compliant packages.

11. A method comprising:

controlling, by a controller, at least one device to cull candidate letters in a mailing job to establish pocket demand for sorting according to a mixing factor analysis; and controlling, by the controller, a plurality of letter sorters based on the pocket demand.

12. The method of claim 11, wherein the mixing factor analysis comprises determining an alternate way to lower the pocket demand.

13. The method of claim 11, further comprising:

determining, by the controller, at least one candidate letter of the candidate letters;

determining, by the controller, at least one captured candidate letter of the candidate letters, having at least one particular destination; and determining, by the controller, a mixing factor based on the mixing factor analysis of the at least one captured candidate letter and the at least one candidate letter.

14. The method of claim 13, further comprising:

routing, by the controller, at least one batch of candidate letters in a particular order based on the mixing factor; wherein the at least one batch of candidate letters comprises the at least one captured candidate letter and the at least one candidate letter.

15. The method of claim 11, further comprising:

collating, by the controller, the candidate letters according to at least one predetermined destination.

16. The method of claim 15, further comprising:

determining, by the controller, a minimum number of collation passes to collate the candidate letters according to the at least one predetermined destination.

17. The method of claim 11, further comprising:

routing, by the controller, the candidate letters to at least one particular letter sorter of the plurality of letter sorters based on the pocket demand, a number of collation pockets, and a maximum number of collation passes.

18. The method of claim 17, further comprising:

determining, by the controller, the pocket demand as X times of the mixing factor, wherein X is a predetermined multiplier.

19. The method of claim 11, further comprising:

utilizing, by the controller, a transport mechanism configured to physically move the sorted letters within the plurality of letter sorters to an assembler.

20. The method of claim 19, wherein the assembler is configured to package sets of the sorted letters based on a plurality of parameters to produce a plurality of compliant packages.

* * * * *